June 30, 1959 — A. J. PERKINS — 2,892,444
PIPE LINING APPARATUS
Filed Nov. 10, 1955 — 4 Sheets-Sheet 1
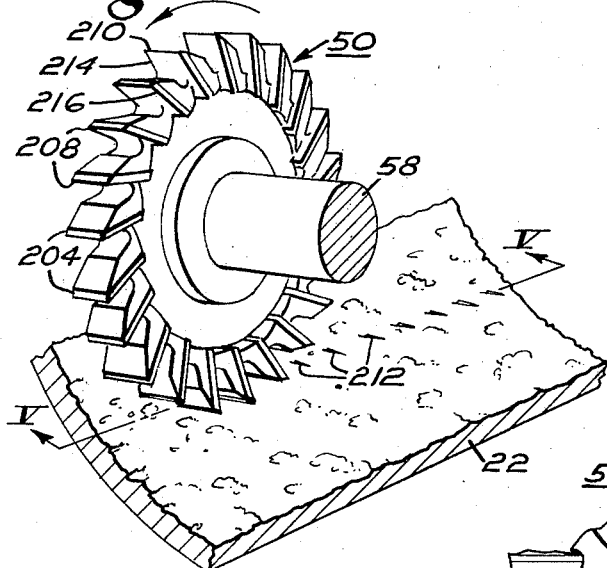
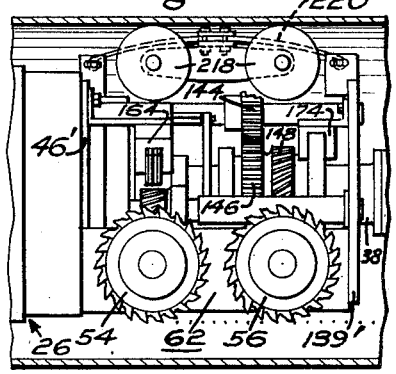
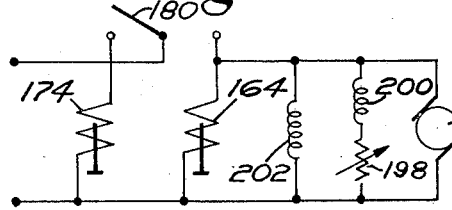
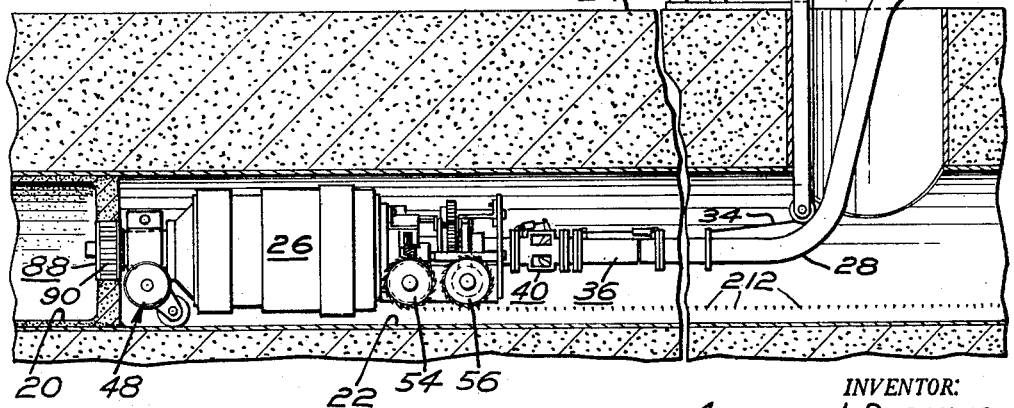
INVENTOR:
ALFRED J. PERKINS
BY:
Bean, Brooks, Buckley & Bean,
ATTORNEYS.

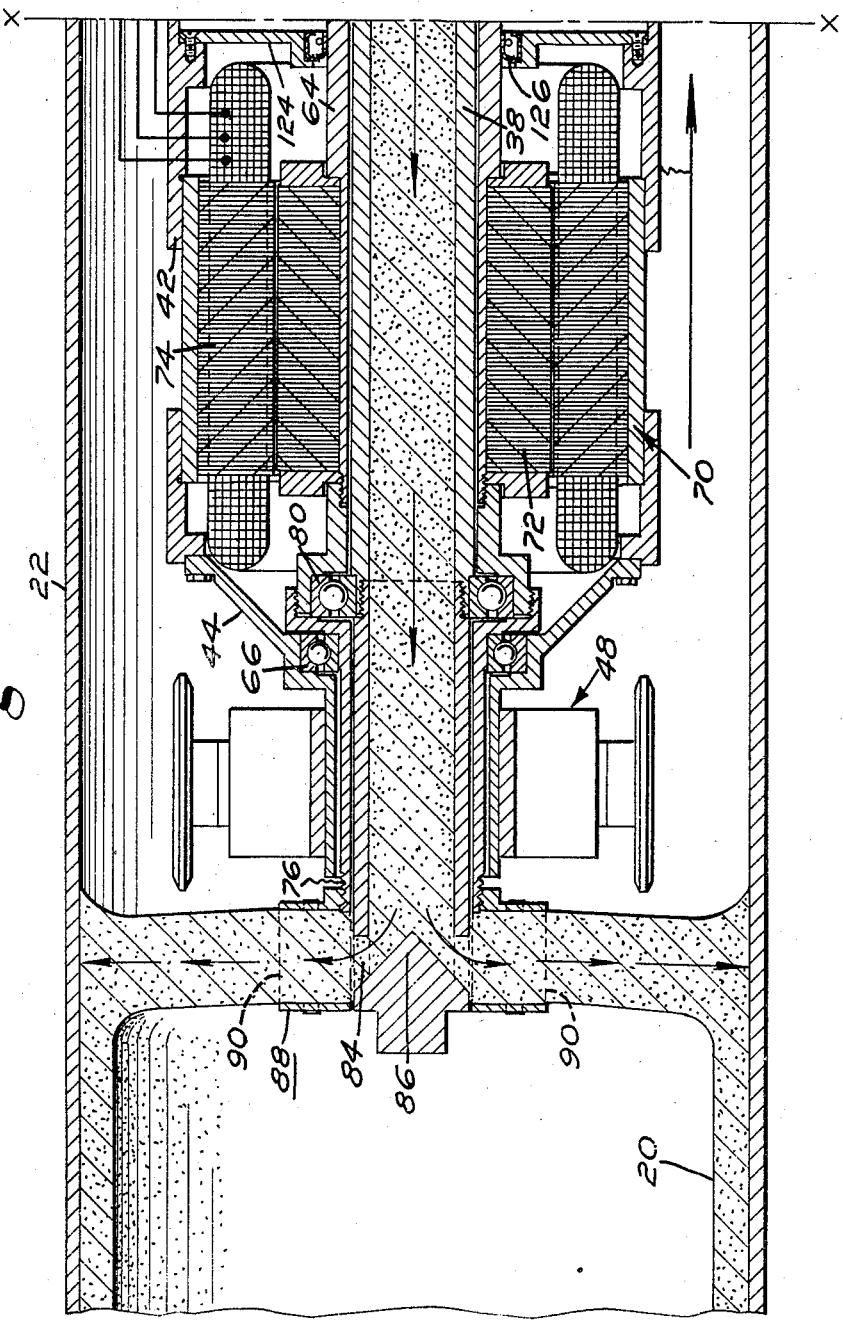

June 30, 1959    A. J. PERKINS    2,892,444
PIPE LINING APPARATUS
Filed Nov. 10, 1955    4 Sheets-Sheet 3
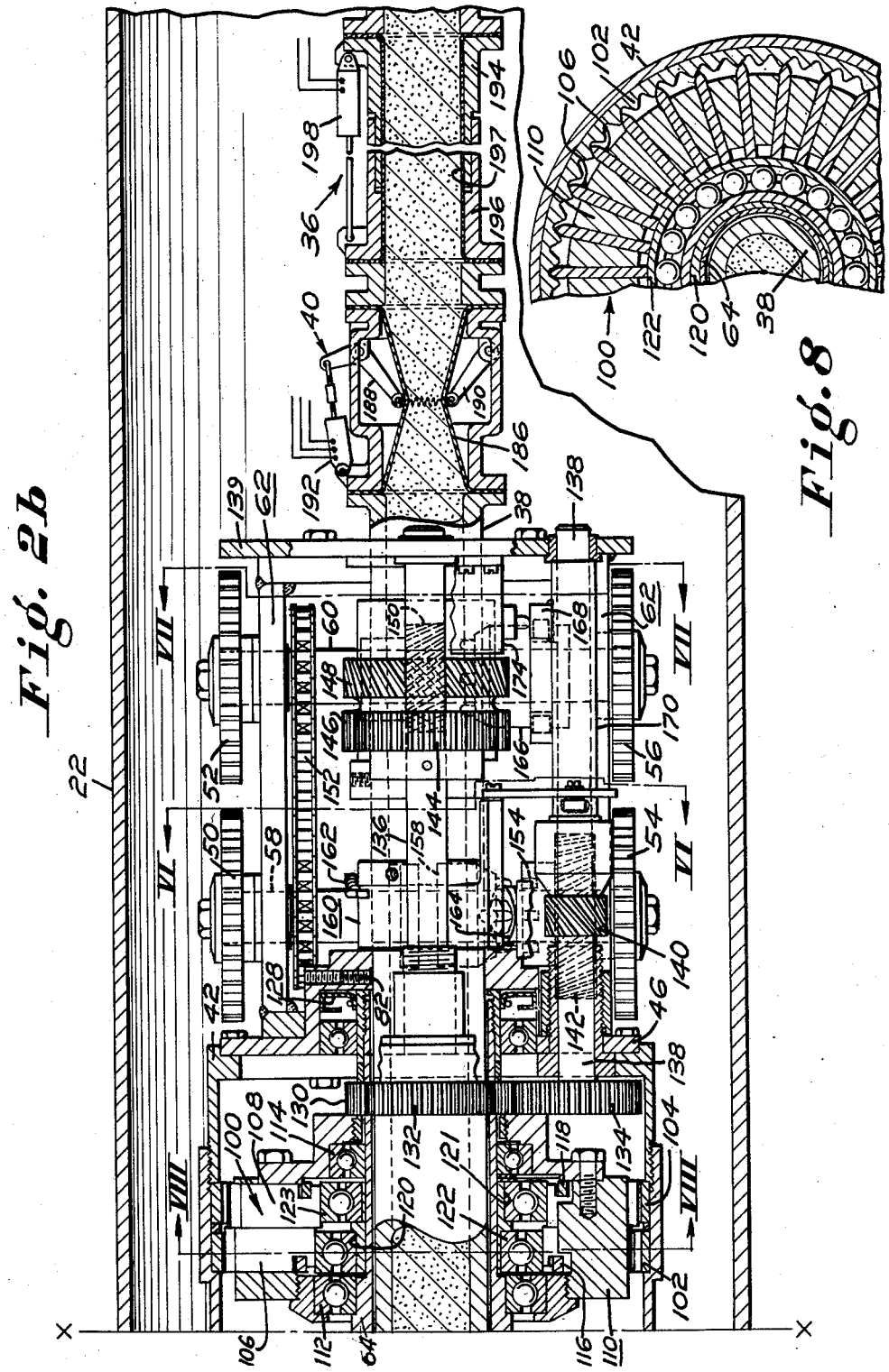

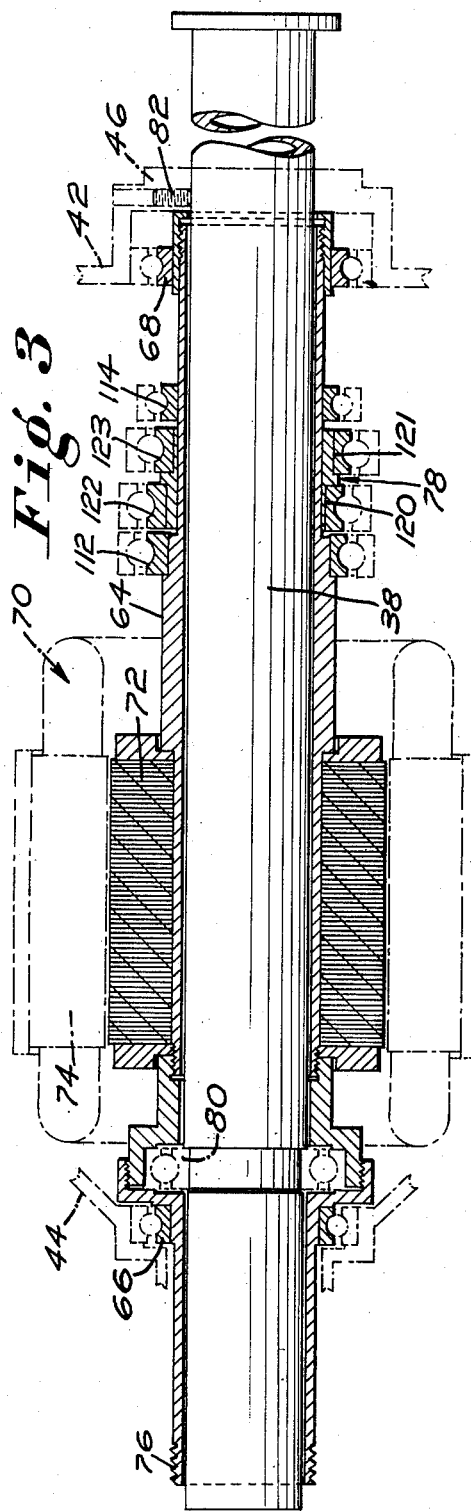

United States Patent Office 2,892,444
Patented June 30, 1959

2,892,444

PIPE LINING APPARATUS

Alfred J. Perkins, Warsaw, N.Y., assignor to Perkins Pipe Linings, Inc., Grand Island, N.Y., a corporation of New York Application November 10, 1955, Serial No. 546,173

12 Claims. (Cl. 118—306)

This invention relates to apparatus for applying a protective coating of mortar or like material to the inner walls of pipe lines, conduits and the like, and especially to an improved lining material applying machine adapted for use in such apparatus.

One type of apparatus for lining pipes available heretofore includes a coating material applying machine which is propelled through the pipe while applying coating material to the interior surface of the pipe by centrifugal distributor means, the material being supplied to a hopper on the machine from a source of material above ground through a hose drawn ahead of the machine by a separate but cooperating mechanism such as a winch device. Apparatus of this general type is described in United States Patents Nos. 2,108,319; 2,262,647, and others to Albert G. Perkins. In my United States patent application Serial No. 502,441 filed April 19, 1955, now Patent No. 2,758,352, an improved system is disclosed which enables the lining of pipe lines of relatively small diameter, this system employing a self-propelled coating machine wherein the coating material, supplied through a hose line under pressure from an above ground source is conducted directly from the hose line through a feed conduit forming part of the machine and extending therethrough to the distributor head thereof coaxially with the pipe being lined.

The present invention provides an improved pipe lining machine of the general kind disclosed in the aforesaid patents and more specifically of a kind embodying the broad teachings of my aforesaid patent application.

In accordance with the present invention the pipe lining machine is made shorter for enabling negotiation of relatively sharp bends such as may be encountered in the lining of small diameter pipes and for facilitating introduction of the machine into the pipe line with a minimum excavation. At the same time the machine embodies a rugged high tractive effort producing propulsion means, which despite the smallness and consequent lightness of the machine, enables use of the machine for drawing long lengths of mortar supply feed hose into the pipe prior to a lining operation and cooperates with the winch or other mechanism withdrawing such feed hose ahead of the machine during the lining operation, thereby materially reducing the number of excavations or other entrances to the pipe lines required in the lining of extensive lengths of pipe of small diameter. It will be understood that the smaller the diameter of the pipe, the lining of which is undertaken, the greater the economic necessity of decreasing the number of excavations needed per mile of pipe lined, and at the same time the more difficult the introduction and management of the mortar feed hose line required.

With these problems in mind, the present invention provides a pipe lining machine wherein a single hollow shaft electric motor mounted annularly about the feed conduit within the machine provides power directly to both the distributor head rotor of the machine and the traction means thereof, this rotating system being arranged in a compact manner characterized by provision of a single hollow drive shaft passing the feed conduit and mounting the distributor head rotor, mounting the drive motor rotor, and mounting and journalling, respectively, the input and output elements of the major speed reduction element of the traction means. In this manner a compact and rugged construction results, and the single motor is used efficiently in that a substantial portion of the power thereof is utilized during the preliminary operation of dragging the feed hose into the pipe to be lined, at which time the power required for tractive effort is high and the power required for operation of the distributor head rotor is low, and also during the pipe lining operation itself, when the respective power requirements are reversed. At the same time the motor required is heavier than would be needed for either of these two power duties alone and consequently provides a high fly wheel effect and reserve of power providing a steady speed for operation of the traction means in either direction of motion.

In carrying out the aforesaid coaxial and compact principles of construction, the traction means of the machine embodies a speed reducer of novel hollow center construction incorporated as aforesaid with the motor mount, this speed reducer providing a high ratio of speed reduction at a high torque capacity, while at the same time providing qualities of ruggedness, insuring a maximum of endurance and reliability in the difficult service for which this machine is intended.

However the aforesaid features of construction which reduce the overall dimensions of the machine also reduce its weight, and the aforesaid features providing a high degree of tractive effort and speed stability would be to no avail were not means provided to transmit this tractive effort to the interior of the pipe wall for actual propulsion of the machine therealong. To this end the traction means includes wheel means utilizing both the rack effect of the roughness of the interior of the pipe to be lined and also having facilities to cut a rack-like track therein. In the preferred embodiment of the invention this track cutting wheel means is so constructed as to provide a maximum resistance against slippage in the direction of the extension from the machine of the motor supply hose, this directional effect enabling not only the drawing of long lengths of feed hose into the pipe to be lined, but also providing, in cooperation with the fly wheel effect of the driving motor and the ruggedness of the speed reduction, a firm anchorage of the machine against the jerking effect of a long feed hose during the reverse motion of actual pipe lining operation.

Accordingly a major object of the invention is to provide a pipe lining machine of improved construction, particularly for use in a system for the lining of small diameter pipe lines, i.e., those of a diameter of less than about 18 inches, in situ wherein the machine is utilized first to draw a long length of feed hose into the pipe to be lined and then is self-propelled in the reverse direction behind the separately propelled hose line during the actual pipe lining operation.

Another object of the invention is to provide a machine as aforesaid which cooperates with the other feed hose management elements of the system to enable utilization of very long lengths of feed hose in a pipe of small diameter for minimizing the number of excavations needed for the lining of a pipe line of a given length.

Still another object of the invention is to provide a machine as aforesaid of minimal dimensions lengthwise as well as in cross section.

Still another object of the invention is to provide a machine as described having a maximum of ruggedness and reliability for enabling continuous use in the lining of long lengths of pipe and for facilitating the lining of small diameter pipes wherefrom extrication of a disabled machine would be most difficult.

Other objects of the invention will be apparent from the following detailed description and claims, and from the drawings wherein:

Fig. 1 is a fragmentary general view, partly in section, showing pipe lining apparatus embodying the invention, in use;

Figs. 2a and 2b are left and right hand continuing portions, respectively, of a top view of the pipe lining machine of Fig. 1, sectioned where indicated about on a horizontal plane through the axis of the pipe being lined;

Fig. 3 is a view similar to that of Figs. 2a and 2b, showing the high speed rotating sub-assembly of the machine in section, certain of the cooperating parts thereabout in phantom line, and the central non-rotating mortar feed conduit therewithin in full line;

Fig. 4 is a fragmentary perspective view showing the track or rack cutting action of one of the traction wheels of the machine as the same is driven along the interior surface of a section of pipe to be lined;

Fig. 5 is a sectional view taken about along line V—V of Fig. 4;

Figs. 6 and 7 are sectional views taken about on lines VI—VI and VII—VII, respectively, of Fig. 2b, showing the forward and reverse drive clutching mechanism of the machine, this mechanism being shown in a neutral position;

Fig. 8 is a fragmentary cross-sectional view taken about on line VIII—VIII of Fig. 2b, showing the eccentric operation of the major speed reduction mechanism of the transmission means of the machine;

Fig. 9 is a schematic wiring diagram of the forward and reverse electrically controlled clutch mechanism of the machine, and of the hose winching means of the apparatus; and Fig. 10 is a fragmentary view, corresponding to a portion of Fig. 1 on an enlarged scale, showing an optional additional wheel arrangement for the machine.

Referring more particularly to Fig. 1, a pipe lining apparatus embodying the invention is shown in use in the applying of a lining 20 to a pipe 22 in place below the ground level 24, the apparatus including a self-propelled pipe lining machine 26 which is supplied with pipe lining material such as mortar through a flexible conduit or hose 28 from a pump or other source of pressure 30 above ground, the hose 28 being drawn ahead of the machine during the pipe lining operation by propulsion means such as a winch 32 which windlasses a draw cable 34 connected at one or more points to the hose 28 as illustrated in the schematic showing. The general scheme of this apparatus is as shown and described in greater detail in my aforesaid patent application Ser. No. 502,441, as is the provision of a telescoping motion disparity take-up 36 between the hose 28 and the mortar feed conduit 38 of the machine 26 and the provision of a flow sensitive device 40 for coordinating the flow rate of coating material as supplied by the pump 30 with the speed of the self-propelled lining machine 26.

Referring now more particularly to Figs. 2a and 2b the construction of the pipe lining machine of Fig. 1 is shown in greater detail. In the preferred embodiment of the invention illustrated, the machine has a frame comprising a generally cylindrical housing or shell 42 having opposite end covers 44, 46. This shell is supported longitudinally and coaxially of the pipe 22 being lined by a tricycle idler wheel arrangement 48 mounted by one end cover 44 and by multiple traction wheels 50, 52, 54, 56 mounted by driving axles 58, 60 which in turn are journalled by a bracket-like machine frame part 62 extending from the other end cover 46 of the housing 42 as shown.

As illustrated most clearly in the sub-assembly showing of Fig. 3, the cylindrical machine housing 42 journals a hollow main drive shaft or sleeve 64 by means of bearings 66, 68 in the opposite end covers 44, 46 of the housing so that this drive shaft extends longitudinally of the machine and coaxially of the pipe being lined. For powering the main drive shaft 64, the machine is provided with an electric motor 70 having a hollow center rotor 72 mounted directly on the drive shaft 64 and a stator 74 mounted by the machine shell 42 in cooperating relation thereto. Hollow center motors of this type are commercially available and are known as "can" type motors in the trade. Operation of the motor 70 thus rotates the shaft 64 on its bearings, and as will appear more fully hereinafter, the shaft powers and mounts both the distributor head rotor of the machine, as by means of threads 76 at one end of the shaft, and the input means, generally indicated at 78, of the major speed reduction element of the traction means of the machine.

As shown, the motor feed conduit 38 of the machine is supported coaxially within the drive shaft 64 by a bearing 80 providing support through the drive shaft and its journal support at 68 to the machine shell 42, and by a fixed connection 82 to the end cover 46 at the other end of the housing 42.

Returning now to Fig. 2a, the machine includes a centrifugal distributor head generally as disclosed in my aforesaid patent application Serial No. 502,441. Thus the outlet end of the mortar supply conduit 38 is provided with radially directed ports 84 which cooperate with a conically shaped baffle or end wall 86 of the conduit to form the mortar extruding stator portion of the distributor head, and this stator portion cooperates with a distributor head rotor 88 mounted by the threaded end 76 of the machine drive shaft as aforesaid and having radially directed vanes 90 which upon operation of the motor 70 distribute the extruded mortar to the pipe 22 wall by centrifugal force as shown.

A major feature of the invention resides in the construction, arrangement and disposition of the primary speed reducer of the machine by which the relatively high speed of the motor 70 is reduced to a rate useful for driving the traction wheel means of the device. For enabling the desired straight through disposition of the feed conduit 38 as shown while at the same time holding the cross sectional dimensions of the machine to a minimum, it is important and highly desirable that this transmission element be of hollow center construction and be disposed in annular manner about the feed conduit. To this end, the machine illustrated embodies a specially constructed speed reducer 100 which is of hollow center construction and is characterized by a large input to output speed change ratio at a high output torque capacity. An early form of a speed reduction transmission is that of a long known gearing sometimes called a "wobble" or "wabble" gearing in which a pair of gear elements, one within and slightly smaller than the other, are mounted eccentrically so that their teeth engage on one side while clearing on the other, the mount of one gear being a cam-like eccentric which when operated serves to move that gear for serial engagement of its teeth with the other gear. Accordingly when the number of teeth in the respective circumferences of the two toothed elements is different, one will rotate with respect to the other, this relative rotational displacement upon one such eccentric revolution being equal to the difference in the number of teeth of the two elements.

An improvement of the aforesaid "wobble" gearing is disclosed in United States Patent 1,543,791 granted June 30, 1925, to W. C. Pitter. In accordance with this patent the inner toothed member comprises a plurality of radial plunger members reciprocably mounted in a cage which is revolvable coaxially with an input member, the input member mounting cam-like means reciprocating the plungers serially outwardly and inwardly for successive engagement of the teeth of an internal gear or rack thereabout, the number of teeth in the rack bearing a nonintegral relation to the number of plungers as in the aforesaid "wobble" gearing so that the cage is rotated relative to the rack upon operation of the input member. However in none of the earlier forms of this kind of transmission is there any teaching of how the same can be used with a compact, hollow center construction or the value of any such use.

In accordance with the present invention the aforesaid teachings of the prior gearing art are utilized insofar as the motion producing principle of a toothed means eccentrically displaced with a near-mating annular rack or gear member is concerned. However, the present invention provides material changes and departures from the prior art and includes a gearing having a hollow center construction for enabling its disposition in annularly embracing relation to the feed conduit of the pipe lining machine. Thus, as shown in Figs. 2b and 8, the speed reducer 100 comprises a pair of internally toothed gears or annular racks 102, 104 carried by the machine housing coaxially with the drive shaft 64 and displaced angularly with respect to each other by one-half tooth distance, and corresponding sets of plungers 106, 108 carried in radial slots of an annular cage or output member 110 which in turn is journaled on the drive shaft 64 by a pair of anti-friction bearings 112, 114 to be coaxial therewith. The plungers of each set are interconnected by a plunger retracting ring 116, 118 so as to form in effect an annular member movable eccentrically by radial sliding motions in the slots of the cage 110 for cooperation with the teeth of the respective racks 102, 104. For moving the respective plunger assemblies in eccentric fashion, the aforementioned reduction gearing input member 78 comprises a double cam member carried by and in effect a part of the drive shaft and having a pair of annular cam or eccentric surfaces 120, 121 arranged to actuate the plunger sets 106, 108 through intermediate anti-friction bearings 122, 123, respectively. These cam devices are timed 180° apart and have a lift sufficient to reciprocate the individual plungers between positions of well into and completely out of engagement with the teeth of the corresponding rack 102, 104, and since the number of plungers in either set bears a non-integral relation to the number of teeth in the corresponding rack, the serial reciprocation of the plungers upon operation of the drive shaft 64 results in rotation of the output member 110. For example, if there are 61 teeth in each rack and 30 plungers in each corresponding set, a speed reduction of 60 to 1 is had between the input shaft 64 and the output member 110. It will be seen that all of the parts of the speed reducer 100 are arranged annularly about the drive shaft 64, the speed reducer input element 78 being carried by that drive shaft and the output member 110 being journaled thereon. By this arrangement an uninterrupted hollow center is provided for passage of the mortar feed conduit 38; furthermore the mounting of the speed reducer parts on the same shaft 64 with the motor 70 results in a machine construction which is longitudinally compact. While the illustrated transmission employs two out of phase rack-plunger-cam mechanisms for load distribution purposes, it will be understood that one or any number of such mechanisms could be employed.

For providing an oil filled chamber for the speed reducer 100, the machine shell is provided with a partition 124 (Fig. 2a) sealed to the main shaft 64 at 126, the other end of the chamber being sealed to the shaft 64 preferably at 128 at the adjacent machine shell end cover 46. The mortar feed conduit 38 serves to cool this sealed unit.

Means are provided to transmit the output provided by the member 110 to the traction wheels 50, 52, 54, 56 for driving the same in the directions desired for propelling the machine into the pipe to be lined and then for propelling it in the reverse direction during the actual pipe lining operation. Preferably this selective means provides a relatively rapid speed of machine travel during such inward motion and a slower speed during the reverse travel. To this end in the illustrated machine the speed reducer cage or output member 110 includes and carries a ring gear 130 which drives a pair of pinions 132, 134 carried by dual output shafts 136, 138 journaled in the machine housing end plate 46 and an end plate 139 of the machine frame extension 62 as shown. In the construction illustrated in Figs. 2b, 7 and 8, one of the output shafts 138 drives a worm 140 carried thereon which engages a worm wheel 142 journaled on one of the axles 58 of the driving wheels. The other output shaft 136 carries a pinion 144 which engages an idler 146 journaled on the mortar feed conduit 38 and having a worm portion 148 engaging a worm wheel 150 journaled on the other driving axle 60. The two gear trains 140, 142 and 144, 146, 148, 150 are adapted and arranged to drive the respective worm wheels 142, 150 at relatively slow speed and faster speed and in opposite directions. The two driving axles 58, 60 are ganged by means of an interconnecting chain 152 taking about sprockets on the respective axles so that selective clutching of one or the other of the two worm wheels 142, 150 will drive both axles in the desired direction at the corresponding speed.

To this end a pair of normally open, alternately engageable clutches are provided as shown in Figs. 6 and 7, for example.

Referring particularly to Fig. 6, the slow speed worm wheel 142 is provided with sockets 154 for reception of the lugs or pins 156 of a clutch member 158 keyed to the corresponding driving axle 58 and reciprocable thereon between normally open and clutched positions as indicated. This clutch action is controlled by an operator member 160 journaled on the feed conduit 38, biased to the position shown by a spring 162 and operable in the opposite, clutch engaging direction by a solenoid device 164.

Referring to Fig. 7, the other, higher speed worm wheel 150 is similarly clutchable to the other driving axle 60 by a clutch member 166 controlled by an operator lever 168 rockably mounted on one of the output shafts 138 by a sleeve 170 thereon, this lever 168 being biased to the normal, declutched position shown by a spring 172 and operable to engage the corresponding clutch 166 by a second solenoid 174.

Referring to Fig. 9, the coils of the solenoid devices 164 and 174 are electrically interlocked against simultaneous operation, as by being connected in circuit with their electric power source 176, 178 through a single pole double throw control switch 180 as shown. If desired the two clutches may be mechanically interlocked also, for example by means of an arm 182 carried by the sleeve 170 and linked at 184 to the first clutch operator 160 so that both clutches cannot be engaged at the same time.

Optionally but desirably the machine includes the aforesaid mortar flow rate sensitive device 40 which may take the form of the means shown in Figs. 1 and 2b and illustrated and described in greater detail in my aforesaid patent application, this means comprising a flexible tube portion 186 biased toward a collapsed configuration by spring loaded means 188, 190 arranged to operate a potentiometer or other position indicating device 192 for control of the remote mortar pressure source and/or the speed of the mortar applying machine operation. As set forth in the aforesaid patent application, this control coordinates the rate of mortar supply with the rate of machine travel for regulating the thickness of the pipe lining applied, and may be carried into effect by conventional motor speed control circuitry.

The machine also desirably includes the aforesaid motion disparity take-up device 36 in the mortar delivery conduit 38 at the connection thereof with the mortar feed hose 28, and this device may also take the form disclosed in my aforesaid patent application, that is having a pair of telescopingly related sleeve members 194, 196 housing a longitudinally extensible liner 197, the assembly being resiliently biased toward the retracted position shown but extensible longitudinally under tension of the hose line 28 and/or its draw cable 34 and having a position sensing device such as a resistor 198 connected in suitable conventional circuitry to control the speed of the winch 32 for adjusting the speed of windlassing of the draw cable 34 to that of the travel of the machine 26, and thus controlling the aforesaid tension, during pipe lining operations. As a schematic example shown in Figs. 1 and 9, the winch 32 may be powered by a direct current motor 199 having a shunt field 200 including the resistor 198 in series in the shunt field circuit. To free the winch for paying out the draw cable 34 during the drawing of the hose 28 into the pipe 20 by the machine 26 prior to pipe lining operation, the winch 32 may be connected to its motor 199 through a clutch 201. Conveniently, this clutch may be a normally open electromagnetic type with its operating coil 202 and the winch motor 199 connected in parallel with the outward travel machine drive clutch solenoid 164 for operation therewith, as shown.

Although the device 36 adjusts the average speed of hose line take-up to that of the machine during actual lining operations, it has been found that a long length of hose will tend to move during such operations in intermittent fashion at the machine end due to the elasticity of the hose 28 and the frictional resistance thereof against motion in the pipe 20 being lined. In order to minimize the spasmodic character of the hose movement, it is necessary to maintain considerable tension thereon at the machine end and this tension together with such jerking movements as cannot be eliminated from the hose withdrawal ahead of the machine transmits a considerable force to the machine. If this force were permitted to effect the machine motion during the pipe lining operation, it would result in an uneven deposit of mortar within the pipe. Accordingly, it is necessary that the machine be firmly anchored in the pipe against this hose tension, and the tractive effort means of the machine is therefore called upon to render much heavier duty service than would be required for movement of the machine alone. As aforesaid the heavy, high speed machine drive motor 70 and its speed-reduction mechanism provides highly stable speeds of driving axle operation in either desired direction, and to transmit this stabilized axle speed for driving the machine, traction wheel means are provided to in effect gear the driving axles to the inner wall of the pipe 20 being lined.

To this end the driving wheels 50, 52, 54, 56 are provided with generally radial traction providing teeth 204 which engage the inner wall of the pipe 22 in a positively interlocking manner. Referring to Fig. 5 it is seen that the inner wall surface of the pipe 22 is inherently irregular and the teeth of the driving wheels are adapted to interlock with these irregularities as shown to provide a firm tractive engagement therewith, the irregularities serving as a kind of rack in which the teeth of the gearlike driving wheels run. Since the irregularities in the inner pipe wall are usually the result of previous corrosion and the like, these surface configurations tend to take the form of pits 206 and in any case are of irregular shape. Accordingly, although the traction providing teeth of the drive wheels could be arcuately shaped to fit the curved surface of the pipe, it is preferred that they be nonconforming thereto such as the straight-edged toothed configuration shown so that the teeth ride primarily on their outer corners 208 for better engagement with such pre-existing pipe wall irregularities as may not extend laterally for a tooth width.

It is also preferred that the teeth be slanted as shown to provide a hook-like engagement with the pipe wall directed against slippage in the direction of the extension of the hose 28. By this means the traction teeth provide maximum slip resistance opposed to the direction of the maximum loads both during the locomotive function of the machine in dragging the hose 28 into the pipe 22 before the actual pipe lining operation, and during the hose anchoring or retarding duty of the machine during the actual pipe lining part of the cycle of operations. While this preferential slip resistance is at the expense of traction in the opposite direction, it has been found that the reduced traction in that opposite direction is entirely adequate since such traction is required only for moving the machine itself and in this it is assisted by the tension on the hose 28.

For performing the aforesaid duties of interlocking with irregularities in the interior pipe surface the preferred teeth are made of a hard durable material such as steel and it is highly desirable that the engaging edges 210 thereof be sharp as shown and of suitable material such as tool steel so as to actually cut rack-like notches 212 in the interior pipe surface for providing a still deeper, more positively engaged and hooked traction to the pipe wall. In the construction shown, the configuration of the teeth whereby they ride primarily on their pointed corners 208 aids in this cutting action. Accordingly, both the edge 210 and outer side portions 214 of the teeth should be of sharp, cutting characteristics. So also the illustrated rigid dual axle mount in the machine frame part 62 concentrates the weight load and thus the cutting force on the wheel or wheels the load bearing teeth of which are not already engaged in a pre-existing pit in the pipe wall, and therefore aids in the cutting action. In the illustrated traction wheels, both sides of the teeth are provided with cutting edges 214, 216 and accordingly the wheels are reversible to the opposite ends of their axles when the pipe wall engaging outer corners 208 become worn.

For further increasing the tractive effort capacity of the wheels 50, 52, 54, 56, means may be provided to bear against the upper wall of the pipe 20 for increasing the load borne by the traction wheels. For example, as shown in Fig. 10, wheels 218 mounted and upwardly biased by a stiff leaf spring 220 may be added to the machine, the spring 220 being mounted by the top portions of the machine frame extension end plate 136' and the adjacent machine housing end cover 46', the parts 139' and 46' corresponding to the parts 46 and 139 of the other figures and all other parts being unchanged.

From the foregoing it will be seen that the present invention provides a pipe lining machine which, though small and compact enough for use in pipes of twelve inch diameter or even less, embodies torque transmission and traction means rugged and powerful enough to drag very long lengths of mortar supply hose, in the order of a thousand feet, into the pipe to be lined. The same propulsion means is adapted to then retard the withdrawal of the hose and therefore becomes a part of the hose withdrawal means during the lining applying part of the cycle of operations.

In the method of operation described, the pump or other lining material source 30 will be operated, and thus lining material will be dispensed, only during travel of the machine outwardly of the pipe. It will be understood that the pump 30 may be controlled manually or may be electrically connected with the other outward operation control circuits for this purpose. Thus during the inward travel hose dragging operation of the machine the distributor head rotor 88 thereof will impose very little load on the machine motor 70 and nearly the full power of that motor will be available for traction purposes.

While the toothed means of the speed reducer shown engage by cyclic motions radially of the unit, it will be understood that the parts could be otherwise arranged, such as for engagement by longitudinal motions.

Thus, while only one embodiment of the invention has been shown and described in detail, it will be understood that the invention and its constituent parts may be otherwise embodied within the spirit of the invention and the appended claims. It will be understood that the term "traction means" is used in the appended claims in the broad sense, encompassing powered propulsion means with or without a motion retarding function, as in the foregoing embodiment of the invention, and also encompassing purely passive motion retarding or braking means which may cooperate with other propulsion forces such as the aforementioned hose tension.

What is claimed is:

1. In a pipe lining apparatus, a lining material applying machine adapted for self propelled travel through a pipe line in a first direction to a site therein for commencement of a lining operation and then to travel in the reverse direction while applying a lining to the pipe, and lining material supply means for said machine comprising a hose line connected to said machine and arranged to be pulled by and with said machine during said travel toward said site and means adapted to withdraw said hose line under tension in advance of said machine during travel thereof in said reverse direction, said machine comprising a distributor head rotor adapted to apply lining material to said pipe by centrifugal action, a lining material feed conduit interconnecting said hose line with said distributor head rotor, an electric motor having a hollow drive shaft journaled about said feed conduit and mounting said rotor, and reversible machine propulsion means comprising speed reducer means and traction means adapted to be driven thereby, said reducer means comprising first and second eccentrically engaging means annularly embracing said drive shaft and arranged to be operated eccentrically with respect to each other by rotation of said shaft to provide a reduced speed rotational output, and said traction means comprising wheel means mounted to support said machine in said pipe and having hook-like traction teeth set for engagement with the pipe wall in opposition to the direction of extension of said hose line from said machine.

2. In a pipe lining apparatus, a lining material applying machine adapted for self propelled travel through a pipe line in a first direction to a site therein for commencement of a lining operation and then to travel in the reverse direction while applying a lining to the pipe, and lining material supply means for said machine comprising a hose line connected to said machine and arranged to be pulled by and with said machine during said travel toward said site and means adapted to withdraw said hose line under tension in advance of said machine during travel thereof in said reverse direction, said machine comprising a distributor head rotor adapted to apply lining material to said pipe by centrifugal action, a lining material feed conduit interconnecting said hose line with said distributor head rotor, an electric motor having a hollow drive shaft journaled about said feed conduit and mounting said rotor, and machine propulsion means adapted and arranged to be driven by said shaft and comprising wheel means mounted to support said machine in said pipe and having hook-like traction teeth set for engagement with the pipe wall in opposition to the direction of extension of said hose line from said machine.

3. In a pipe lining apparatus, a lining material applying machine adapted for self propelled travel through a pipe line in a first direction to a site therein for commencement of a lining operation and then to travel in the reverse direction while applying a lining to the pipe, and lining material supply means for said machine comprising a hose line connected to said machine and arranged to be pulled by and with said machine during said travel toward said site and means adapted to withdraw said hose line under tension in advance of said machine during travel thereof in said reverse direction, said machine comprising a distributor head rotor adapted to apply lining material to said pipe by centrifugal action, a lining material feed conduit interconnecting said hose line with said distributor head rotor, an electric motor having a hollow drive shaft journaled about said feed conduit and mounting said rotor and reversible machine propulsion means adapted and arranged to be driven by said shaft and comprising wheel means mounted to support said machine in said pipe and having hook-like traction teeth set for engagement with the pipe wall in opposition to the direction of extension of said hose line from said machine.

4. In a pipe lining apparatus, a lining material applying machine adapted for self propelled travel through a pipe line in a first direction to a site therein for commencement of a lining operation and then to travel in the reverse direction while applying a lining to the pipe, and lining material supply means for said machine comprising a hose line connected to said machine and arranged to be pulled by and with said machine during said travel toward said site and means adapted to withdraw said hose line under tension in advance of said machine during travel thereof in said reverse direction, said machine comprising distributor head means having a rotor adapted to apply lining material to said pipe by centrifugal action, wheel means mounted to support said machine in said pipe and having hook-like traction teeth set for engagement with the pipe wall in opposition to the direction of extension of said hose line from said machine, and machine powering means comprising an electric motor aranged to drive said wheel means in said first and reverse directions and to drive said rotor during machine operation in said reverse direction.

5. In a pipe lining machine adapted to be propelled through a pipe being lined and comprising rotary distributor means adapted to apply lining material to the pipe wall centrifugally, a machine frame, machine motion control means mounted by said frame and comprising machine weight bearing traction means and means adapted to power said traction means, said traction means comprising first and second wheels mounted on said frame at one end thereof on parallel axes spaced longitudinally thereof to provide weight support thereto, said wheels having circumferential teeth adapted to track upon the inner surface of said pipe and to interlock with irregularities of said surface, said teeth having sharp bearing edges adapted to cut such irregularities in said surface.

6. In a pipe lining machine adapted to be propelled through a pipe being lined, lining material feed conduit means, a rotatably mounted hollow drive shaft encircling said conduit means, an electric motor having a hollow center power output rotor mounted by said shaft, and machine propelling means comprising a hollow center speed reducer comprising cam means mounted by said shaft adjacent to the motor rotor, first hollow center annular toothed means journaled on said shaft in embracing relation thereto and in cooperating relation to said cam means, and second hollow center toothed means fixed coaxially of said shaft and in embracing relation to said first toothed means, said cam means being adapted upon rotation thereof with said drive shaft to actuate said first toothed means eccentrically of said shaft, said first toothed means being adapted for serial engagement of the teeth thereof with the teeth of said second toothed means by and upon such eccentric operation and having a number of teeth bearing a non-integral relation to the number of teeth of said second toothed means, and machine propulsion traction means connected to said first toothed means for operation by rotation thereof.

7. In a pipe lining machine adapted to travel through a pipe line, lining material feed conduit means, and machine propulsion means comprising a rotatably mounted hollow drive shaft encircling said conduit means, rotatably operable machine traction means, and transmission means interconnecting said shaft with said traction means, said transmission means comprising first circumferentially toothed means mounted annularly about said shaft, cooperating means on said shaft and said first toothed means adapted to move the same eccentrically of said shaft by and upon rotation thereof, and second circumferentially toothed means mounted coaxially with said shaft and having teeth arranged for serial engagement with teeth of said first toothed means by and upon the eccentric motion of said first toothed means, the number of teeth of said first and second toothed means bearing a non-integral relationship to each other, and torque transmission means for said traction means arranged to be driven by and upon relative movement of said first and second toothed means.

8. In a pipe lining machine adapted to travel through a pipe line, lining material feed conduit means, and machine power means comprising a rotatably mounted hollow drive shaft encircling said conduit means, and power output transmission means comprising first circumferentially toothed means mounted annularly about said shaft, cooperating means on said shaft and said first toothed means adapted to move the same eccentrically of said shaft by and upon rotation thereof, and second circumferentially toothed means mounted coaxially with said shaft and having teeth arranged for serial engagement with teeth of said first toothed means by and upon the eccentric motion of said first toothed means, the number of teeth of said first and second toothed means bearing a non-integral relationship to each other, and torque output means arranged to be driven by and upon relative movement of said first and second toothed means.

9. In a pipe lining machine adapted to travel through a pipe line, lining material feed conduit means, and machine power means comprising a rotatably mounted hollow drive shaft encircling said conduit means, and power output transmission means comprising first and second eccentrically engaging means annularly embracing said shaft and arranged to be operated eccentrically with respect to each other by rotation of said shaft for rotating relatively to each other by and upon such eccentric operation, and torque output means arranged to be driven by and upon relative movement of said first and second engaging means.

10. In a pipe lining machine adapted to travel through a pipe line, lining material feed conduit means, and machine power means comprising a rotatably mounted hollow drive shaft encircling said conduit means, first and second hollow center annularly toothed means mounted to encircle said shaft, means including a part on said shaft adapted to displace said first and second toothed means relative to each other by and upon rotation of said shaft, the teeth of said first and second means being nonintegrally related in number and being adapted to engage at an annularly traveling point by and upon such relative displacement and to clear at a point diametrically opposite said traveling point, and torque output means adapted and arranged to be driven by relative rotation of said first and second means.

11. In a pipe lining machine adapted to travel through a pipe, lining material feed conduit means, and machine propulsion means comprising a rotatably mounted hollow drive shaft encircling said conduit means, positive mechanical speed reducer means comprising first and second hollow center annularly toothed means mounted to encircle said shaft, means including a part on said shaft adapted to displace said first and second toothed means relative to each other by and upon rotation of said shaft, the teeth of said first and second means being non-integrally related in number and being adapted to engage at an annularly traveling point by and upon such eccentric relative displacement and to clear at a point diametrically opposite said traveling point, and traction means arranged to be driven by relative rotation of said first and second means and comprising toothed wheel means adapted to track upon the inner surface of said pipe and to engage positively surface irregularities therein.

12. In a pipe lining machine adapted to travel through a pipe line, lining material feed conduit means, and machine power means comprising a rotatably mounted hollow drive shaft encircling said conduit means, first and second hollow center annular means having cooperating teeth and being mounted to encircle said shaft, said teeth of said first annular means being adapted for serial displacement and arranged to thereupon contact teeth of said second annular means for imparting movement to one of said annular means relative to the other, means including a part on said shaft adapted to effect such serial displacement by and upon rotation of said shaft, and torque output means adapted to be driven by said movement.

References Cited in the file of this patent

UNITED STATES PATENTS

| | | |
|---|---|---|
| 19,189 | Fawkes | Jan. 26, 1858 |
| 669,210 | Burch | Mar. 5, 1901 |
| 1,543,791 | Pitter | June 30, 1925 |
| 1,860,385 | Crapo | May 31, 1932 |
| 1,870,875 | Scheuer | Aug. 9, 1932 |
| 1,933,624 | Guthrie | Nov. 7, 1933 |
| 2,108,319 | Perkins | Feb. 15, 1938 |
| 2,185,570 | Ridley | Jan. 2, 1940 |
| 2,262,647 | Perkins | Nov. 11, 1941 |
| 2,285,910 | Buigne | June 9, 1942 |
| 2,303,088 | Perkins | Nov. 24, 1942 |
| 2,359,751 | Cummings et al. | Oct. 10, 1944 |
| 2,455,273 | Schott et al. | Nov. 30, 1948 |
| 2,518,330 | Jasper et al. | Aug. 8, 1950 |
| 2,704,873 | Kirwan et al. | Mar. 29, 1955 |

OTHER REFERENCES

Catalog of Universal Gear Corporation (8 pages, page 8 relied upon). (Received in Division 12, Aug. 12, 1953.)